(12) United States Patent
Blake et al.

(10) Patent No.: US 7,391,906 B2
(45) Date of Patent: Jun. 24, 2008

(54) METHODS AND SYSTEM FOR PROVIDING IMAGE OBJECT BOUNDARY DEFINITION BY PARTICLE FILTERING

(75) Inventors: Andrew Blake, Stapleford (GB); Michel Gangnet, Cambridge (GB); Patrick Perez, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 745 days.

(21) Appl. No.: 10/011,207

(22) Filed: Dec. 5, 2001

(65) Prior Publication Data

US 2003/0103682 A1 Jun. 5, 2003

(51) Int. Cl.
*G06K 9/48* (2006.01)
(52) U.S. Cl. ...................................... 382/199
(58) Field of Classification Search ................. 382/260, 382/266, 164, 199, 173, 316, 203, 206, 268
See application file for complete search history.

(56) References Cited

U.S. PATENT DOCUMENTS

| | | | | |
|---|---|---|---|---|
| 5,103,488 | A * | 4/1992 | Gemello et al. | 382/199 |
| 5,265,173 | A * | 11/1993 | Griffin et al. | 382/103 |
| 5,995,115 | A * | 11/1999 | Dickie | 345/441 |
| 6,487,310 | B1 * | 11/2002 | Bishop et al. | 382/186 |
| 7,130,446 | B2 * | 10/2006 | Rui et al. | 382/103 |
| 2003/0103647 | A1 * | 6/2003 | Rui et al. | 382/103 |

OTHER PUBLICATIONS

Perez et al., JetStream:Probabilistic Contour Extraction with Particles,Jul. 7-14, 2001, IEEE, vol. 2,pp. 524-531.*

Sullivan et al., Guiding Random Particles by Deterministic Search, Jul. 7-14, 2001, Computer Vision, 2001. ICCV 2001. Proceddings. Eighth IEEE Conference on, vol. 1, pp. 323-330.*

Vermakk et al., Sequential Monte Carlo Fusion of Sound and Vision for Speaker Tracking, Jul. 7-14, 2001, Computer Vision, 2001. ICCV 2001. Proceedings. Eighth IEEE Conference on, vol. 1, pp. 741-774.*

Nestares et al., Probabilistic Tracking of Motion Boundaries with Spatiotemporal Predictions, 2001 (month and day unspecified), 2001 IEEE Computer Society Conference on Computer Vision and Pattern Recognition, 2001, vol. 2, pp. II-358-II-365.*

(Continued)

*Primary Examiner*—Matthew C. Bella
*Assistant Examiner*—Dennis Rosario
(74) *Attorney, Agent, or Firm*—Woodcock Washburn LLP

(57) ABSTRACT

Systems and methods are provided for interactive construction of an object boundary by minimizing a sum of costs, including costs associated with inconsistency of the image data and costs associated with undesired curve shape properties. A particle filter optimization algorithm is implemented that incorporates a variable strength, intrinsic preference for boundary smoothness. The particle filter generates alternative sequences of random moves, constructed in parallel, to avoid becoming stuck in local minima. Approximate optimization algorithms are utilized, keeping computational burden low, freeing resources to analyze intrinsic costs associated with local curvature. In one embodiment, a user may construct a curve by launching a particle stream, and by choosing visually satisfactory locations on the stream from which to relaunch particles. The user can also provide other input, such as drop down dams to redirect the stream at T-junctions. Additionally, a facility is incorporated to break the smoothness constraint automatically at corners of the object boundary.

78 Claims, 19 Drawing Sheets
(17 of 19 Drawing Sheet(s) Filed in Color)

OTHER PUBLICATIONS

Sidenbladh et al., Learning Image Statistics for Bayesian Tracking, Jul. 7-14, 2001, Eigth IEEE Conference on Computer Vision, 2001, vol. 2, pp. 709-716.*

Torma et al., Efficient Object Tracking in Video Sequences by means of LS-N-IPS, Jun. 19-21, 2001, 2nd International Symposium on Image and Signal Processing and Analysis, 2001, pp. 277-282.*

North et al., Learning and Classification of Complex Dynamics, Sep. 2000, IEEE Transactions on Pattern Analysis and Machine Intelligence, vol. 22, Issue:9, pp. 1016-1034.*

Deutscher et al., Articulated Body Motion Capture by Annealed Particle Filtering, Jun. 13-15, 2000, Proceedings on Computer Vision and Pattern Recognition, vol. 2, pp. 126-133.*

Kristjansson et al., Keeping Flexible Active Contours on Track Using Metroplos Updates, 2000, NIPS, No. 13, pp. 859-865.*

Dellaert, Monte Carlo Localization for Mobile Robots, IEEE linternational Conference on Robotics and Automation, May 10-15, 1999, vol. 2, pp. 1322-1328.*

Isard, A Smoothing Filter for Condensation, Proc. European Conf. on Computer Vision,1998, vol. 1, pp. 767-781.*

Blake et al., The Condensation Algorithm-Conditional Density Propagation and Applications to Visual Tracking, 1997, MIT Press, vol. 9, pp. 361.*

Isard et al. , Contour Tracking by Stochastic Propagation of Conditional Density, 1996, ECCV .96,pp. 343-356.*

Blake et al., Active Contours,1998, Cambridge University Press, pp. 255-267.*

Cox, I.J., "A Review of Statistical Data Association Techniques for Motion Correspondence," *Int. J. Computer Vision,* 1993, 10(1), 53-66.

Dijkstra, E.W., "A Note on Two Problems in Connection with Graphs," *Numerische Mathematik,* 1959, 1, 269-271.

Geman, D. et al., "An Active Testing Model for Tracking Roads in Satellite Images," *IEEE Trans. on Pattern Analysis and Machine Intelligence,* 1996, 18(1), 1-14.

Gleicher, M., "Image Snapping," *Computer Graphics Proceedings,* Annual Conference Series, SIGGRAPH 1995, 183-190.

Gordon, N. et al., "Novel Approach to Nonlinear/Non-Gaussian Bayesian State Estimation," *IEEE Proc.-F,* 1993, 140(2), 107-113.

Harris, C. "Geometry from Visual Motion," In *Active Vision,* Blake, A. and Yuille, A.L. (eds.), 1992, The MIT Press, 263-284.

Isard, M.A. et al., "Contour Tracking by Stochastic Propagation of Conditional Density," In *Computer Vision—ECCV '96,* 4th European Conference on Computer Vision, Cambridge, UK, Buxton, B. and Cipolla R. (eds.), Apr. 15-18, 1996, 343-356.

Kass, M. et al. "Snakes: Active Contour Models," In *Proc. 1st Int. Conf. on Computer Vision,* London, England, Jun. 8-11, 1987, 259-268.

Kirkpatrick, S. et al., "Optimisation by Simulated Annealing," *Science,* 1983, 220(4598), 671-680.

Kitagawa, G. "Monte Carlo Filter and Smoother for Non-Gaussian Nonlinear State Space Models," *J. Comput. Graphical Statistics,* 1996, 5(1), 1-25.

Martelli, A., "An Application of Heuristic Search Methods to Edge and Contour Detection," *Commun. ACM,* 1976, 19(2), 73-83.

Mitsunaga, T. et al., "Autokey: Human Assisted Key Extraction," *Computer Graphics Proceedings,* Annual Conference Series, SIGGRAPH 1995, 265-272.

Montanari, U., On the Optimal Detection of Curves in Noisy Pictures. *Commun. ACM,* 1971, 14(5), 335-345.

Mortensen, E.N. et al., "Intelligent Scissors for Image Composition," *Computer Graphics Proceedings,* Annual Conference Series, SIGGRAPH 1995, 191-198.

Perez, P. et al., "*JetStream:* Probabilistic Contour Extraction with Particles," *submitted to ICCV,* 2001, http://research.microsoft.com/vision, pp. 1-8.

* cited by examiner

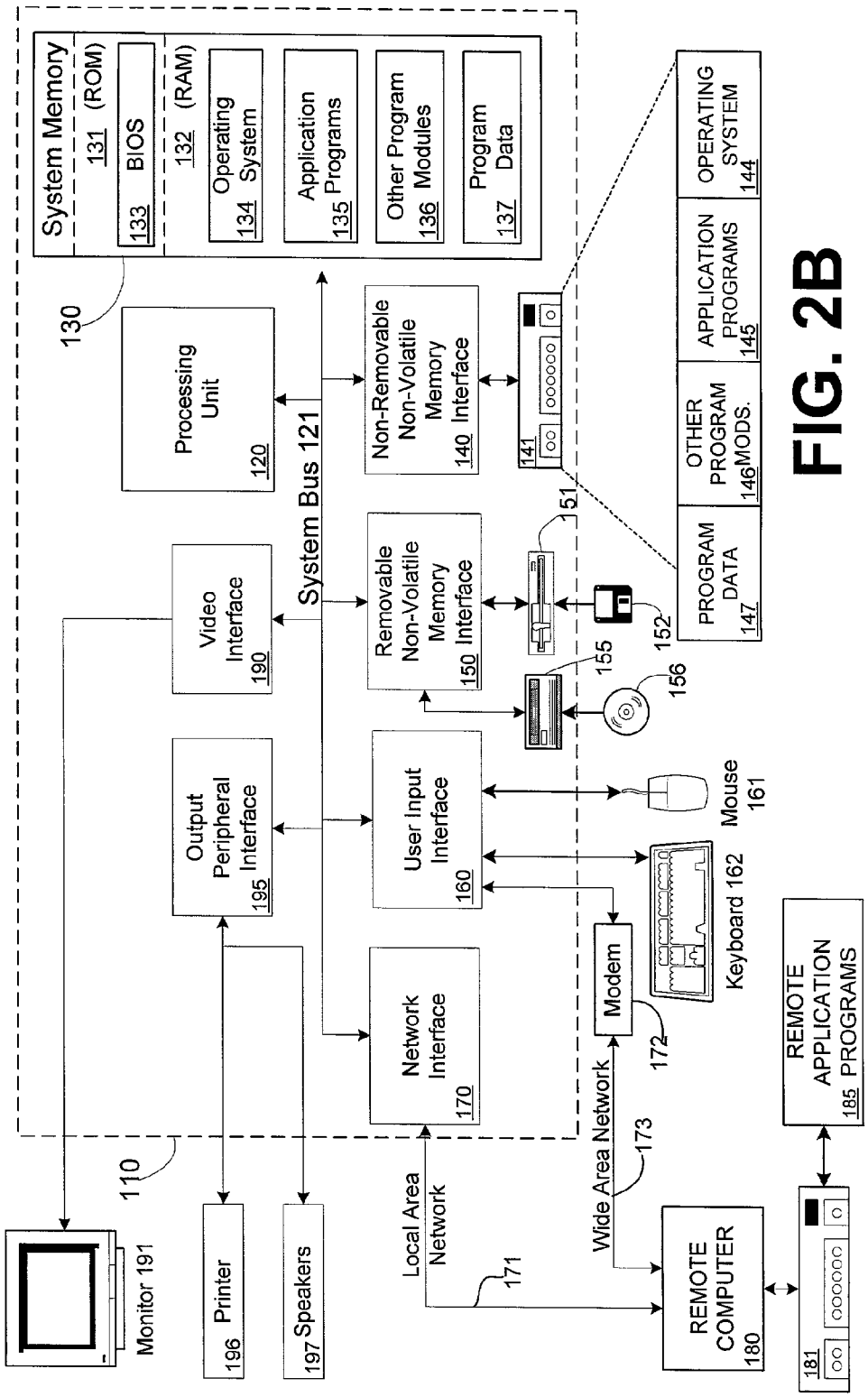

METHODS AND SYSTEM FOR PROVIDING IMAGE OBJECT BOUNDARY DEFINITION BY PARTICLE FILTERING

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document Copyright © 2000, Microsoft Corp.

FIELD OF THE INVENTION

The present invention relates to systems and methods for cutting out graphics or images from graphics or image data. More particularly, the present invention relates to systems and methods for constructing boundary data for a selected region of interest in graphics or image source data, wherein uses of the boundary data include separating the bound region of interest from the rest of the source data.

BACKGROUND OF THE INVENTION

The ability to cut out objects from a greater image setting, such as may be found in a computing device in a computer system, has numerous industrial and consumer applications. For instance, in a security setting, it may be desirable to isolate a vehicle, and its two-dimensional (2-D) outline, for purposes of tracking the vehicle from frame to frame as the vehicle moves. Similarly, one could imagine the tracking of a basketball or the like, as it moves around in a basketball game, for purposes of moving a camera. Marketing applications may include a task of assembling a variety of different, or disparate, media sources to form a unique marketing message, and thus there may be a need for cutting out certain objects from one media source to include, or superimpose, in another media source. Consumers alike may wish to cutout portions of photographs, or other media content, for personal use, e.g., to cutout the family dog from a digital photograph and superimpose the family dog next to the family cat.

In short, there are an increasing number of digital images available just about anywhere, when one considers the Internet as a source of multimedia digital content, the increasing use and exchange of digital photographs and the ability to transform analog representations of images to corresponding digital representations. FIG. 1 illustrates an exemplary image 200 in connection with which it may be desirable to define the boundary of an object 210. In this case, the object 210 is a cheetah and the strong texturing of the foreground, i.e., the cheetah's pelt, makes the task of image object cut-out a difficult task. While human eyes coupled to a human brain can intuitively separate the cheetah 210 from the background 220 in three dimensions, computers are less intuitively inclined, and are restricted to instructions given to them for interpreting the two-dimensional arrays of color pixels, or two-dimensional array of black and white pixels.

The extraction of a region of interest from one image to be pasted into another image is thus a fundamental and difficult image editing capability. This editing task is generally divided into three elementary steps. First, a region of interest is selected. Second, the foreground region, represented by a field of RGB-values and an α-mask, is extracted from the source image, while paying particular attention to mixed pixels on the region boundary. Third, the textured foreground is pasted onto the new background, using the α-mask. For a variety of reasons, present methods for performing the first part of the process, namely foreground region selection, are inadequate.

Thus, there is a need for a new interactive method for constructing a bounding curve for the foreground. Optimal automatic detection of image boundaries has been studied to some degree and some solutions have been proposed. For instance, one present day system has developed a dynamic programming algorithm for extraction boundaries by optimizing a cost function measuring a combination of intrinsic and extrinsic properties. Another present day system approached the same kind of optimization problem using a form of heuristic search.

Another such system borrowed the machinery of probabilistic multi-target tracking to develop a curve following algorithm that deals with branching. More recently, the problem of automatic tracking of roads in images has been addressed using a probabilistic decision tree algorithm based on likelihood ratio tests, and by applying a particle filter. However, no existing system has adapted such particle filtering techniques to the interactive problem of image cut-out. Thus, presently, no one has developed a system that performs automatic optimal curve detection by particle filtering.

Achieving high quality cut-out is difficult in practice because the foreground boundary needs to be located accurately, to within a pixel or better. Marking individual pixels by hand can be accurate, but is laborious and thus can only be done properly at a snail's pace. Semi-automatic methods can speed up the process, but they have to rely on assumptions about the shape properties of the bounding contour, whose validity is somewhat specific to a particular contour. Thus, there is a need for a more robust approach to the problem of image cut-out, whereby a box of tools is provided to and selected by the user, on a problem-by-problem basis. Some commonly provided pre-existing tools include: Freeform curve drawing, the use of region properties, curve snapping, snakes and "intelligent scissors."

Freeform curve drawing relates to a technique wherein a curve is constructed explicitly, either as a mathematical curve, e.g. a parametric spline, or pixel by pixel, giving the user maximum control, but also maximum labor. Tools that work using region properties, such as ADOBE's® Magic Wand and similar tools, work on an entirely different principle. Rather than using boundary properties, these tools use region properties, extending the color profile of seed regions; a related technique is known as key extraction. Curve snapping is used to accelerate the drawing of boundaries by snapping the cursor towards detected image features such as edges and corners. This saves labor wherever the image features are sufficiently well defined for reliable, automatic detection. The snakes algorithms allow an initial, approximately drawn, bounding curve to be refined globally, taking into account both extrinsic properties such as the degree of coincidence with detected image features, and intrinsic properties such as smoothness. Smoothness is encouraged by penalizing curvature in a cost function for the fitted curve. The snakes algorithms can save even more labor, but the inbuilt tendency to smoothness is not appropriate in all situations. "Intelligent Scissors" techniques, such as Livewire, minimize a combined cost based on various extrinsic properties but does so serially, by dynamic programming (DP), starting at one end of the curve. In this way, intrinsic properties are taken into account and the serial construction fits well with the way humans draw; however, in practice the use of DP restricts the intrinsic properties, i.e., curve length can be taken into account, but not curve smoothness.

Thus, there is a need for a robust mechanism or component that provides boundary definition of an object in an image for purposes of selecting a region of interest. In this regard, it would be advantageous to provide a tool that includes the desirable results or elements of both the snake algorithms and the "intelligent scissors" techniques, described above. Like the snake algorithms, it would be advantageous to provide a tool that incorporates curve smoothness, not just curve length. Like the "intelligent scissors" techniques, it would be advantageous to provide a tool that constructs a boundary for the object serially, i.e., by beginning at one point, or end, of the curve and building the boundary curve from that point. It would be still further desirable to use approximate cost minimization algorithms, such as Monte Carlo algorithms to aid in the minimization of computation necessary to achieve these goals, thereby providing a real-time solution to the problem of image boundary definition.

SUMMARY OF THE INVENTION

In view of the foregoing, the present invention provides systems and methods for interactive construction of an object boundary by minimizing a sum of costs, including costs associated with inconsistency of the image data and costs associated with undesired curve shape properties. A particle filter optimization algorithm is implemented that incorporates a variable strength, intrinsic preference for boundary smoothness. The particle filter generates alternative sequences of random moves, constructed in parallel, to avoid becoming stuck in local minima. The present invention also relies on approximate optimization algorithms, keeping computational burden low, freeing resources to analyze intrinsic costs associated with local curvature.

In one embodiment, a user constructs a curve by launching a particle stream, and chooses visually satisfactory locations on the stream from which to relaunch particles. The user can also provide other input, such as drop down dams to redirect the stream at T-junctions. Additionally, a facility is incorporated to break the smoothness constraint automatically at corners of the object boundary.

Other features and embodiments of the present invention are described below.

BRIEF DESCRIPTION OF THE DRAWINGS

The file of this patent contains at least one drawing/photograph executed in color.

FIG. 2B is a block diagram representing an exemplary nonlimiting computing device in which the present invention may be implemented;

DETAILED DESCRIPTION OF PREFERRED EMBODIMENTS

Overview

The present invention provides methods and systems for interactive construction of an object boundary by minimizing a sum of cost, including costs associated with inconsistency of the image data and costs associated with undesired curve shape properties. The particle filter optimization algorithm used is essentially sequential making for efficient user interaction. The present invention also incorporates a variable strength, intrinsic preference for boundary smoothness. This helps with segmenting strongly textured objects, where texture edges may cause the constructed boundary to distort. The particle filter generates alternative sequences of random moves, constructed in parallel, to avoid becoming stuck in local minima. The present invention also relies on approximate optimization algorithms; as a result, computational burden does not increase strongly with the order of the cost function as is the case with certain prior art systems, enabling the possibility of including an intrinsic cost for local curvature into the boundary calculus.

In accordance with the present invention, a user constructs a curve by launching a particle stream, and by repeatedly choosing visually satisfactory locations on the stream from which to relaunch particles. The user can drop down dams to redirect the stream, for example, at T-junctions. Additionally, a facility is incorporated to break the smoothness constraint automatically at corners on the object boundary.

Figure 1:
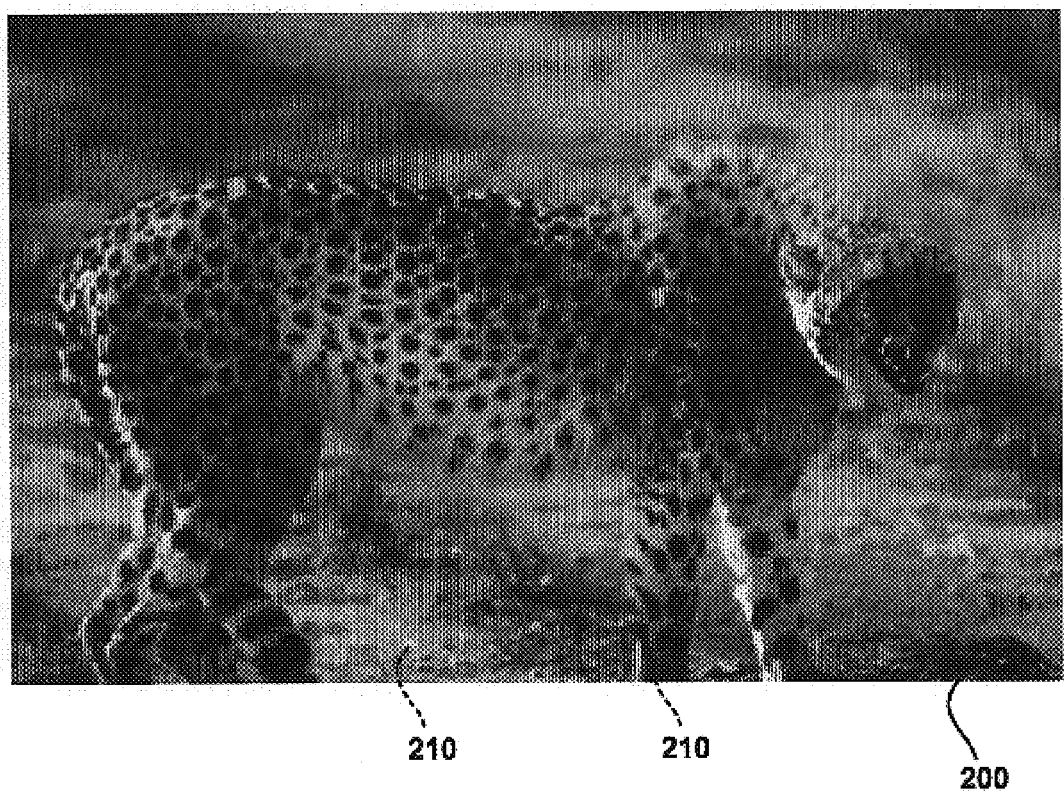
FIG. 1 illustrates an exemplary image in connection with which it may be desirable to define the boundary of an object found within the image.
Figure 3:
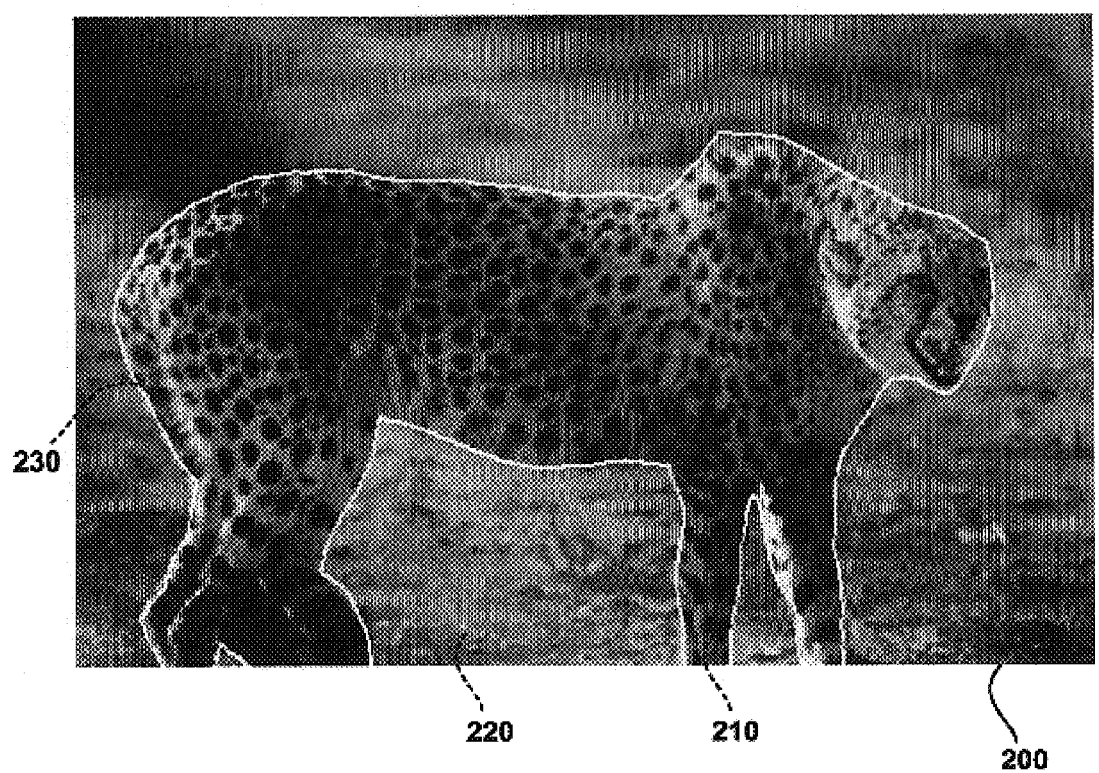
FIG. 3 illustrates a boundary result generated in accordance with the present invention as applied to the exemplary image of FIG. 1, according to certain parameter settings.

As shown in FIG. 3, the present invention has been applied to the extremely difficult problem (due to the strong texturing of the foreground pelt) of outlining the cheetah 210 of FIG. 1. With the algorithms of the present invention, around 30 user interactions are sufficient to construct the boundary 230, separating the cheetah 210 from the background 220. Exemplary, non-limiting parameter values that were used include M=100, $\sigma_\theta$=0:02 rad and v0.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have data sets for which it would be desirable to perform the image boundary definition techniques of the present invention.

Figure 2A:
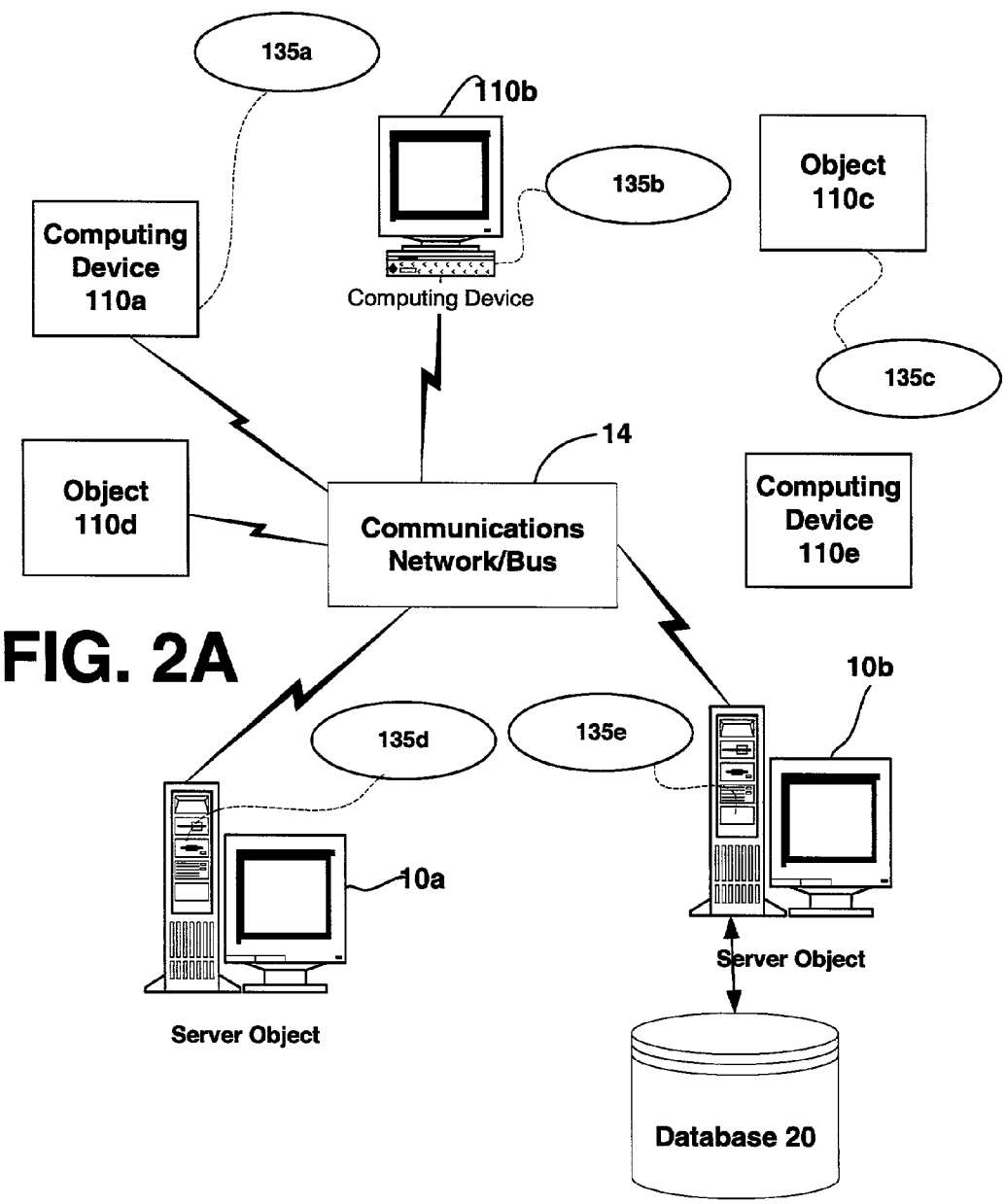
FIG. 2A is a block diagram representing an exemplary network environment having a variety of computing devices in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2A. In accordance with an aspect of the invention, each object 10 or 110 may contain data for which it would be desirable to perform image cut-out or boundary definition. It may also be desirable to compare an image cut-out from one object 10 or 110 with an image cut-out of another object 10 or 110.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. The image cut-out algorithm(s) of the present invention may be implemented in such an environment.

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and is accessible within the home using either wireless (e.g., HomeRF or 802.11 b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment Media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as image boundary or cut-out data based upon common ground.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2A illustrates an exemplary networked or distributed environment, with a server in communication with client computers via a network/bus, in which the present invention may be employed. In more detail, a number of servers 10*a*, 10*b*, etc., are interconnected via a communications network/bus 14, which may be a LAN, WAN, intranet, the Internet, etc., with a number of client or remote computing devices 110*a*, 110*b*, 110*c*, 110*d*, 110*e*, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to communicate to another computing device with respect to image cut-out or boundary definition services.

In a network environment in which the communications network/bus 14 is the Internet, for example, the servers 10 can be Web servers with which the clients 110*a*, 110*b*, 110*c*, 110*d*, 110*e*, etc. communicate via any of a number of known protocols such as hypertext transfer protocol (HTTP). Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Any computer 10*a*, 10*b*, 110*a*, 110*b*, etc. may be responsible for the maintenance and updating of a database 20 or other storage element in accordance with the present invention, such as a database 20 for storing image processing software for processing images in accordance with the present invention. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other devices 111 and databases 20.

Exemplary Computing Device

FIG. 2B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved is a desirable, or suitable, environment for operation of the image cut-out algorithm(s) of the invention.

Although not required, the invention can be implemented via an operating system, for use by a developer of services for a device or object, and/or included within application software that aids in processing image data. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .Net platform includes servers, building-block services, such as Web-based data storage and downloadable device software. Generally speaking, the .Net platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, portions of the invention may also be implemented via an operating system or a "middle man" object between a network and device or object, such that image processing services may be performed by, supported in or accessed via all of .NET's languages and services, and in other distributed computing frameworks as well.

A Framework for the Boundary Curve Optimization Problem

For boundary curve construction in accordance with the invention, i.e., for boundary curve techniques that include particle filtering techniques, incorporates curve smoothness as a criterion in addition to curve length and serially constructs the boundary, it is helpful to frame the problem as an optimization of a given mathematical framework. For purposes of the following description, the notation $q_{i:j}$ with $i<j$ stands for $(q_i, q_{i+1}, \ldots, q_j)$ Thus, given an image plane $Q \subset R^2$ with general point $q \in Q$, the problem solved by the present invention may be posed as the discovery of a sequence of points $q_{0:n} = (q_0 \ldots q_n)$, representing a polyline that minimizes a cost function of the following form:

$$E_n(q_{0:n}, I) = \sum_{i=s}^{n} h(q_{i-s:i}) + \sum_{i=s'}^{n} f(q_{i-s':i}, I)$$

under certain constraints. h is the local intrinsic cost function, a measure of the irregularity of candidate curves, without reference to the image I. $f$ is the local extrinsic cost function, a measure of the local mismatch between the curve and the image I. In each case, cost is computed locally, at $q_i$, in terms of the positions of $q_i$ and its immediate predecessors in the point-sequence. In the intrinsic case, s immediate predecessors are taken into account. $s>0$ is the order of the cost function h. Similarly $s' \geq 0$ is the order of $f$. The combined order of the cost function $E_n$ is defined to be:

$r = \max(s, s')$

Examples of intrinsic and extrinsic cost functions follow.

For the choice of h, for larger orders s, generally the irregularity measure is subtler as a result. For example, with $s=1$, the minimum sensible value, one possible irregularity measure is simply the total length of the curve, achieved by choosing the following local cost function:

$h(q_i, q_{i-1}) = |q_i - q_{i-1}|$.

For some purposes, this is too crude a measure of irregularity. For example, the snake algorithms mentioned in the background incorporate a measure of curvature, for which $s=2$ is required since curvature is a 3-point measure $h(q_i, q_{i-1}, q_{i-2})$. An order $s'=0$ example of the extrinsic local cost function $f$ is:

$f(q_i, I) = -|\nabla I(q_i)|$ which encourages curve points where image gradient is high. The above cost function is one component of an extrinsic cost function used in the Livewire "intelligent scissors" approach referred to in the background. An order $s'=1$ example is:

$f(q_i, q_{i-1}, I) = -F((q_i - q_{i-1}) \cdot \nabla I(q_i))$, where F is some nonlinear, positive rescaling function. This encourages the curve to align with the image gradient. The properties of the cost function $E_n$ for the snake algorithms and for the "intelligent scissors" Livewire approach can be summarized using the above optimization framework.

The Livewire approach has maximum order $r=1$, since there is no intrinsic term, and the extrinsic term has order $s'=1$. While Livewire has no intrinsic term, Livewire does have a penalty for irregularity, only such irregularity measures always appear intimately combined with image dependent measures. The fact that $r=1$ means that the objective function $E_n$ can be minimized exactly using a form of DP. To be precise, the minimization:

$$\min_{n, q_{0:n-1}} E_n(q_{0:n}, I) \text{ with } q_0 = u, q_n = v$$

can be achieved according to Dijkstra's algorithm, known to those of ordinary skill in the image cut-out art, in linear time—i.e. in time O(N), where N is the number of pixels in the image. However, the restriction to order $r=1$ means that the Livewire approach cannot incorporate an intrinsic curvature term, though an extrinsic term, based on image curvature, could be added.

The snake algorithms have maximum order $r=2$, since the intrinsic cost has order $s=2$ and the extrinsic cost has order $s'=0$. The increased order gives the advantage of a subtler measure of curve irregularity, because the intrinsic cost is sensitive to curvature. The presence of an intrinsic curvature term is particularly beneficial in the presence of strong texture, where image-based measures may be misleading. The snake algorithms have a computational disadvantage however. The DP approach is not computationally feasible, unless additional restrictions are placed on accessibility of the domain Q, and that leaves only numerical methods of local optimization. Since optimization is only local, a good initial approximation to the optimal curve must be provided. This demands labor from the user, and is a disadvantage from the point of view of interactive efficiency.

Thus, while there are some beneficial aspects to the prior art approaches, which the present invention shares, the invention improves upon those techniques, and therefore does not suffer from the shortcomings of the prior art techniques. The present invention makes use of a recently developed Monte Carlo approach to approximate probabilistic sampling, namely the particle filter. As with the Livewire approach, the particle filter is not restricted to local optimization, and shares the sequential nature that makes the Livewire approach convenient for interactive use. However, like the snake algorithms, the present invention avoids the restriction to order $r=1$. Details follow in the next section.

Boundary Data Construction and Image Cut-Out

As related above, the present invention implements a robust mechanism that provides boundary definition of an object in an image, e.g., for the purpose of selecting a region of interest to cut out from the image. The mechanism implements particle filtering techniques, incorporates curve smoothness as a criterion, in addition to curve length and serially constructs a boundary for the object being bound by beginning at one point, or end, of the curve and building the boundary curve from that point, or end. The invention further uses approximate cost minimization algorithms, such as Monte Carlo algorithms, to aid in the minimization of computation necessary to achieve these goals, thereby providing a real-time solution to the problem of image boundary definition.

With particle filtering, in order to make use of Monte Carlo methods for optimization, the present invention makes a probabilistic interpretation of $E_n$ as a posterior probability distribution p. The posterior is defined as $p(q_{r:n}|q_{0:r-1}, I)$, denoting that the posterior p scores the likely values of $q_{r:n}$, given an image I, and initial conditions fixing $q_{0:r-1}$. The posterior p is related to the cost $E_n$ as:

$$E_n(q_{0:n}, I) \propto -\log p(q_{r:n}|q_{0:r-1}, I)$$

The optimization problem is thus to find the Maximum a Posteriori Probability (MAP) estimate of $q_{r:n}$, given I and the initial conditions on $q_{0:r-1}$. One well-known example of a Monte Carlo approach to optimization is simulated annealing, which makes use of this probabilistic interpretation of $E_n$. However, for the boundary construction of the invention, the optimization problem has a special structure, i.e., the maximum order r of the cost function is small. This observation in part led to the particularly efficient, sequential Monte Carlo algorithm of the invention, i.e., the particle filter can be applied.

From the above equations, the posterior probability can be rewritten as a product:

$$p(q_{r:n}|q_{0:r-1}, I) \propto p_0(q_{r:n}|q_{0:r-1}) L(I|q_{0:n})$$

of the intrinsic term, the prior distribution:

$$p_0(q_{r:n}|q_{0:r-1}) = \prod_{i=r}^{n} \Phi(q_i|q_{i-s:i-1})$$

and the extrinsic term, the data likelihood:

$$L(I|q_{0:n}) = \prod_{i=r}^{n} L_i(I|q_{i-s':i})$$

The prior distribution is a product of terms in the process density $\Phi$, which is related to the local intrinsic cost h by $h \propto \log \Phi$, and has the probabilistic interpretation that it is a probability distribution that predicts the likely values of the ith polyline point $q_i$, given the previous s points. Process density $\Phi$ is thus an intuitively meaningful object in its own right, and below, the intrinsic properties of the curve are specified directly in terms of $\Phi$, rather than via h.

The data likelihood $L_i$ is related to the extrinsic cost functions $f$, and is also meaningful in its own right. The invention assigns the order of the data likelihood $L_i$ to be s'=1 so that the equation expressed above for the data likelihood $L_i$ simplifies to:

$$L(I|q_{0:n}) = \sum_{i=1}^{n} L_i(I|q_i, q_{i-1})$$

The particle filter utilized in the algorithms of the invention includes a sequence of n−r+1 iterations, in which sample paths are grown in parallel, lengthening by 1 step at each iteration. As mentioned, there is an intrinsic model aspect and an extrinsic model aspect according to the various embodiments of the invention.

As to the intrinsic model aspect, the probability distribution of the boundary curve generated by the invention is represented by specifying a random process, denoted by $\Phi$, for constructing a boundary polyline. In a Monte Carlo framework, it is sufficient to specify the random process constructively, i.e., an explicit, functional form for the process density $\Phi(q_i|q_{i-1:i-s})$ is not needed, as it is with deterministic optimization methods. The invention uses a random process with order s=2, the minimum required for sensitivity to curvature, as follows:

$$q_i = q_{i-1} + R(\theta_i)(q_{i-1} - q_{i-2}),$$

where $R(\theta_i)$ is the matrix for rotation through the random angle $\theta_i$. The resulting polyline has fixed edge length d, typically chosen to be around d=1 pixel. The external angle $\theta_i$ of the ith polygon segment is a random variable, drawn from a modified normal distribution as follows:

$$\theta_i \leftarrow \begin{cases} U(-\pi/2, \pi/2) & \text{with probability } v \\ N(\theta_i, 0, \sigma_\theta^2) & \text{otherwise} \end{cases}$$

where U denotes a uniform distribution and N a normal distribution. The outlier fraction $v \in (0,1)$ is chosen to be small. An exemplary, non-limiting choice for v according to the invention is v=0.05. Modification of v allows for occasional deviations from smoothness, and works well except in heavy texture. The degree of general curve smoothness is determined by the angular RMS deviation parameter $\sigma_\theta$, which can be adjusted by the user, typically in the non-limiting range $\sigma_\theta \in (0.02, 0.1)$ radians.

The optimization by sequential Monte Carlo techniques in accordance with the invention includes initialization, iterative filtering and maximization.

The initialization step includes initializing the expression:

$$\{(q_{0:r-1}^{(m)}, \pi_{r-1}^{(m)}), m = 1 \ldots M\} \text{ by calculating}$$

$$\text{for } m = 1 \ldots M, \text{ the expression: } q_{0:r-1}^{(m)} = q_{0:r-1}; \pi_r^{(m)} = 1/M$$

The iterative filtering step includes performing, for i=r . . . n, prediction, likelihood weighting and selection. The prediction of the iterative filtering includes calculating, for m=1 . . . M, the draw predicted positions $\tilde{q}_i^{(m)}$ for the ith point, at random, from the process density function $\Phi$ according to the following expression:

$$\tilde{q}_i^{(m)} \leftarrow \Phi(q_i|q_{i-r:i-1}^{(m)}).$$

The likelihood weighting of the iterative filtering includes calculating, for m=1 . . . M, the weight $\pi_i^{(m)}$ according to the following expression:

$$\pi_i^{(m)} = K_i L_i(I|q_i^{(m)}, q_{i-1}^{(m)})$$

where $K_i$ is chosen to normalize weights such that:

$$\sum_m \pi_i^{(m)} = 1$$

The selection of the iterative filtering includes sampling, for m=1 . . . M, the index k' from the discrete probability distribution (over k) $\pi_i^k$, and calculating:

$$q_{0:i}^{(m)} = \left(q_{0:i-1}^{k'}, \tilde{q}_i^{k'}\right)$$

The maximization step includes calculating the optimum MAP curve according to the expression:

$$q_{0:n}^{(m)} \text{ where } = \arg\max_m \pi_n^{(m)}$$

As to the extrinsic model aspect of the invention, extrinsic information, in the probabilistic interpretation, is carried by the data likelihood $L(I|q_{0-n})$, which has order s'=1. The data likelihood is a product of local likelihood functions $L_i(I|q_i, q_{i-1})$ that apply at each curve point. The local likelihood for the present invention is made up of the edge likelihood, the corner likelihood and the user likelihood. The edge likelihood $L_i^e(I|q_i, q_{i-1})$ is a probabilistic measure of the degree of consistency of the strength and direction of local image gradients with that of the boundary at $q_i$. The corner likelihood $L_i^c(I|q_i)$ is a special case of the edge likelihood, for use at image corners, which suppresses any sensitivity to direction. The user likelihood $L^u(q_i)$ is a vehicle for guidance supplied interactively, by a user, wishing to bias or override the curve constructed automatically on the basis of $L_i^e$ and $L_i^c$ alone. These three terms are combined to define $L_i$ as follows:

$$L_i(I|q_i, q_{i-1}) = \begin{cases} L_i^c(I|q_i)L^u(q_i) & \text{if corner } (q_i) \\ L_i^e(I|q_i, q_{i-1})L^u(q_i) & \text{otherwise} \end{cases}$$

where corner(q) is a predicate that is defined below.

For edges, the likelihood used for the observed image data is calculated according to the following:

$$L_i^e(I|q_i, q_{i-1}) = \exp\frac{\mu}{d}\det[\nabla I(q_i), (q_i - q_{i-1})]$$

where $\mu$ is an image-gradient coefficient. The constant $\mu$ has the dimensions of distance (i.e. units of pixels), since intensity is taken to be dimensionless, scaled to $I\in[0, 1]$. There are two particular properties of image gradients, which can be observed practically in experiments with images, which are conveyed by the edge likelihood $L_i^e$.

The first property is that away from valid region boundaries, i.e., over general texture, the magnitude $|\nabla I(q_i)|$ has an exponentially decaying probability distribution:

$$p(|\nabla I(q_i)|) \propto \exp -\frac{\mu}{d}|\nabla I(q_i)|$$

whereas, over valid boundaries, the distribution is much closer to uniform. The negative exponential term for non-contour points becomes a positive exponential term in the equation above for edges, which may be explained in terms of likelihood ratios. The second property is that the direction of the image gradient is distributed symmetrically around the local contour direction, and the angular distribution becomes tighter as $|\nabla I(q_i)|$ increases.

The image-gradient coefficient $\mu$, which has the dimensions of distance, is set, in practice, to an approximate non-limiting, $\mu$=10 pixels. Practically, $\nabla I(q_i)$ is computed at the pixel center closest to the real-valued point $q_i$.

For corners, the norm of the gradient is usually large, but direction cannot be accurately measured. Thus, corners are an important exception to the validity of the image-gradient distribution above. A tool for characterizing these situations is provided by the eigenstructure of the local empirical covariance matrix of the gradient defined as:

$$P(q) = \frac{1}{|W(q)|}\sum_{q' \in W(q)} \nabla I(q')\nabla I(q')^T$$

with W(q) being a small window centered at q. In this regard, the eigenvalues $\lambda_1(q) \geq \lambda_2(q) \geq 0$ are both large at corners, but only $\lambda_1(q)$ is large along edges. Based on this observation, a simple corner detector can be obtained by looking at pixels for which $\lambda_2$ exceeds a certain fraction $\tau \in (0, 1)$ of its maximum value $\lambda_{2,max}$ in the image, as captured by the predicate:

corner(q)=($\lambda_2(q)$>$\tau\lambda_{2,max}$)

Figure 4A:
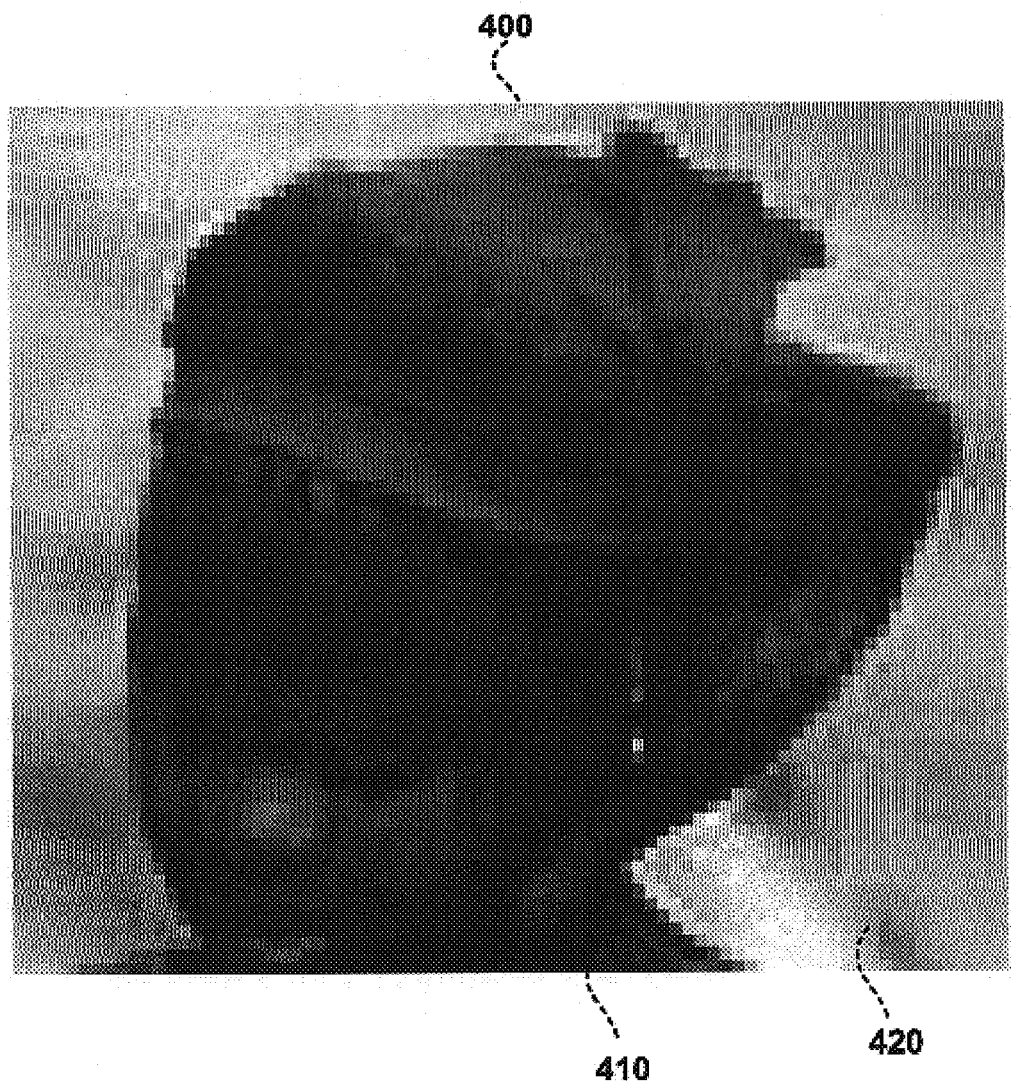
FIGS. 4A through 4D illustrate an exemplary cornering calculation in accordance with the present invention.
Figure 4B:
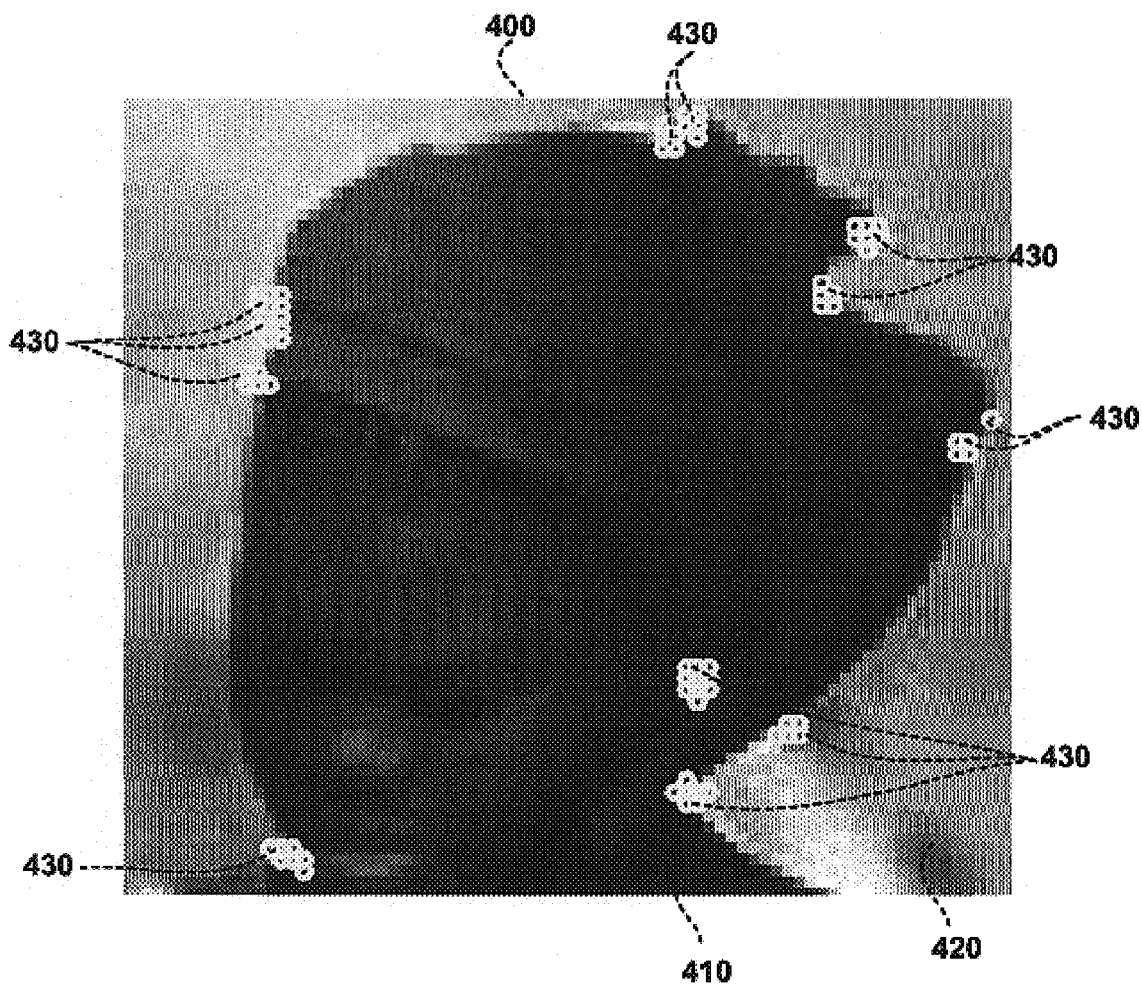
Figure 4C:
Figure 4D:

FIGS. 4A and 4B illustrate the discovery of corner regions 430 in an image 400 having an object of interest 410 and background 420, based on the second eigenvalue $\lambda_2(q)$ of the empirical local gradient variance P(q). The circled pixels, labeled as corners 430, verifies $\lambda_2(q)$>$\tau\lambda_{2,max}$, with $\tau$=0.6. FIGS. 4C and 4D illustrate the dichotomy between having the corner likelihood function and not having the corner likelihood function. As is evident from the figures, the initial lack of discovery of the first corner causes the boundary curve 440a to cut through the object of interest 410, rather than properly around the object of interest 410 as illustrated by the bounding curve 440b of FIG. 4D generated with the present invention, with M=100 particles per step.

In one embodiment, the parameters is learned from a training set of marked corners 430, thereby working the equation backwards. A non-limiting choice of $\tau$=0.6 or thereabout has been found to be a satisfactory choice. Where a corner has been detected by the corner predicate above, it is appropriate to accept a wide range of image gradient directions, but to continue to favor high gradient magnitude. This is achieved by removing the direction sensitivity of the edge likelihood equation yielding:

$$L_i^c(I|q_i)=\exp(\mu|\nabla I(q_i)|)$$

With respect to interactive guidance, a probabilistic device may be implemented by which the user can supply additional interactive information, deemed to be probabilistically independent from the information derived automatically from the image. The further information is embedded in the user likelihood function $L^u(q)$, and the assumed independence leads to it being applied multiplicatively in the overall extrinsic equation above which takes into account edge likelihood, corner likelihood and user interaction. Where $L^u(q)$<1, particle flow is discouraged, causing a constriction that repels the boundary contour. Alternatively, a region in which $L^u(q)$>1 serves as a channel that draws in the particle stream. There are various possibilities for the use of this mechanism. In practice, it suffices to provide the user with the facility to place one or more dams, defined as regions $R_k \subset Q$, such that $$L^u(q) = \begin{cases} \epsilon & \text{if } q \in R_k, \text{ for some } k, \\ 1 & \text{otherwise} \end{cases}$$

with $\epsilon$ set to some small value such as $\epsilon=0:00001$. This is preferable to setting $\epsilon=0$ because, in the event that all particles are accidentally encased in dams, the particles can in effect tunnel their way out. The use of dams in an exemplary embodiment is illustrated in more detail below.

Figure 5A:
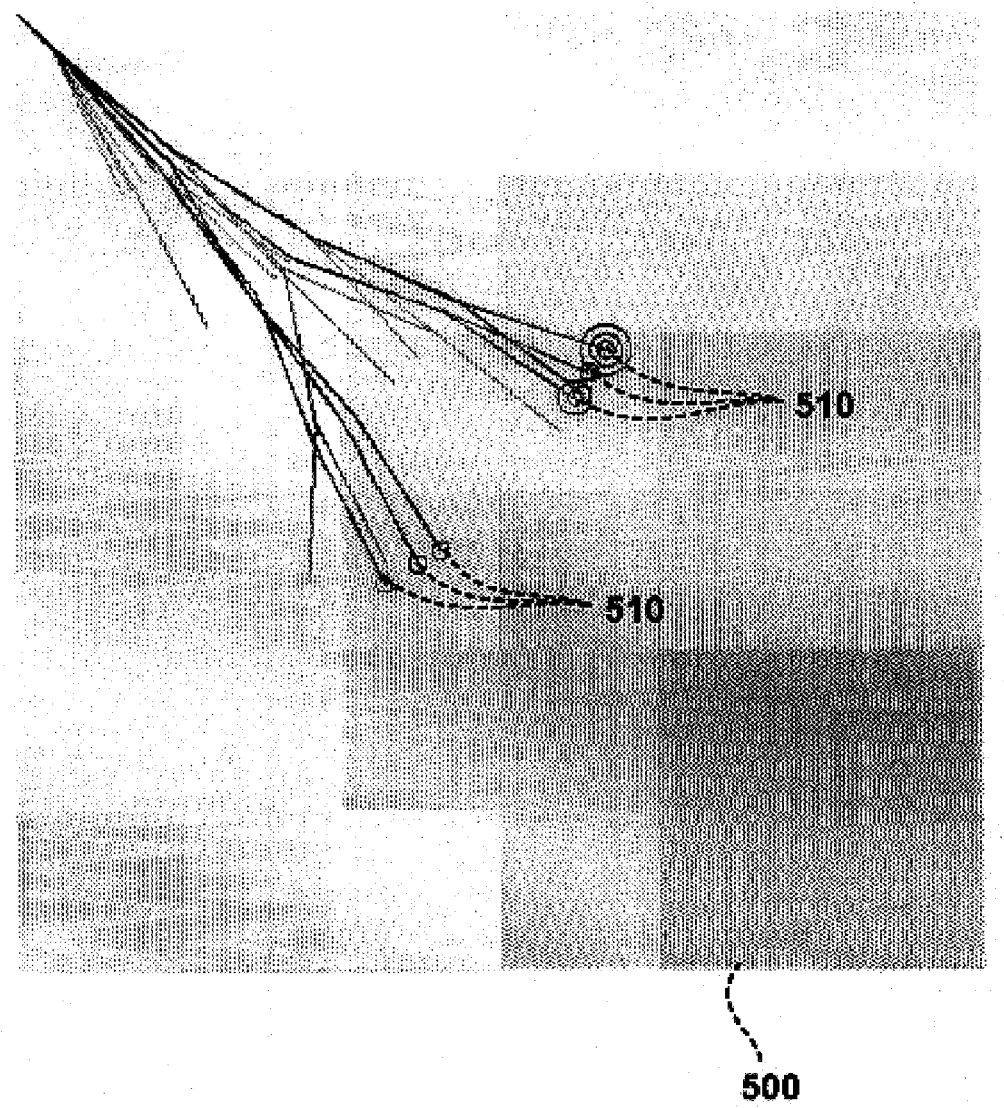
FIGS. 5A through 6D illustrate exemplary non-limiting particle filtering in accordance with the present invention.
Figure 5B:
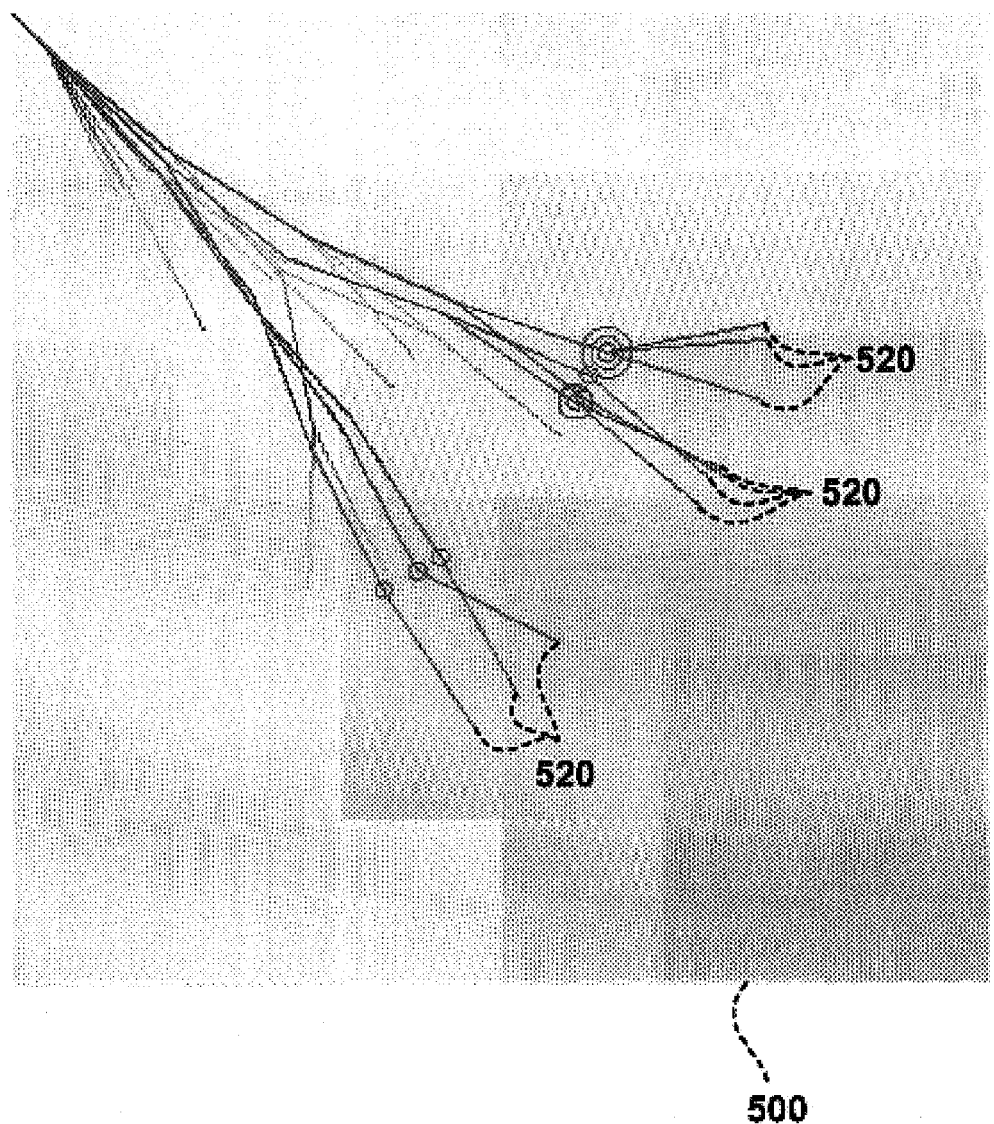
Figure 5C:
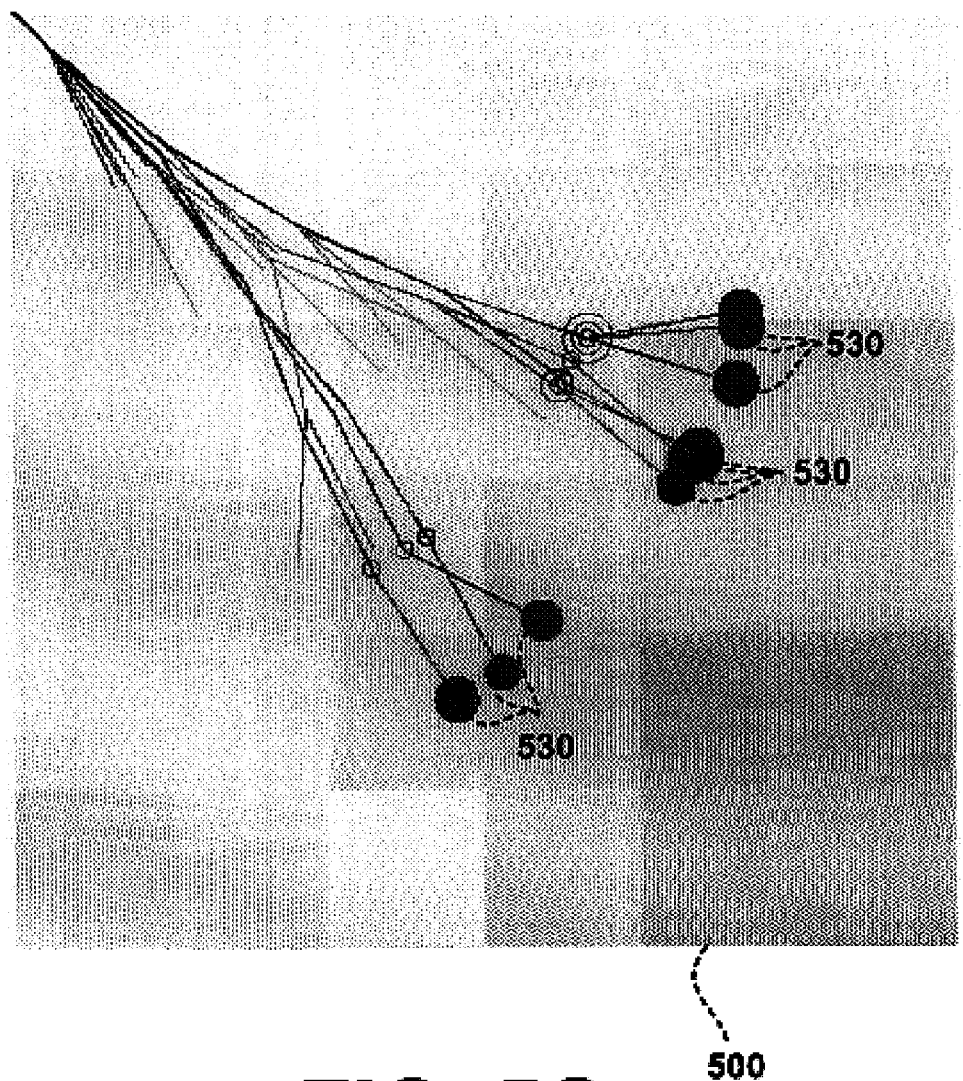
Figure 5D:
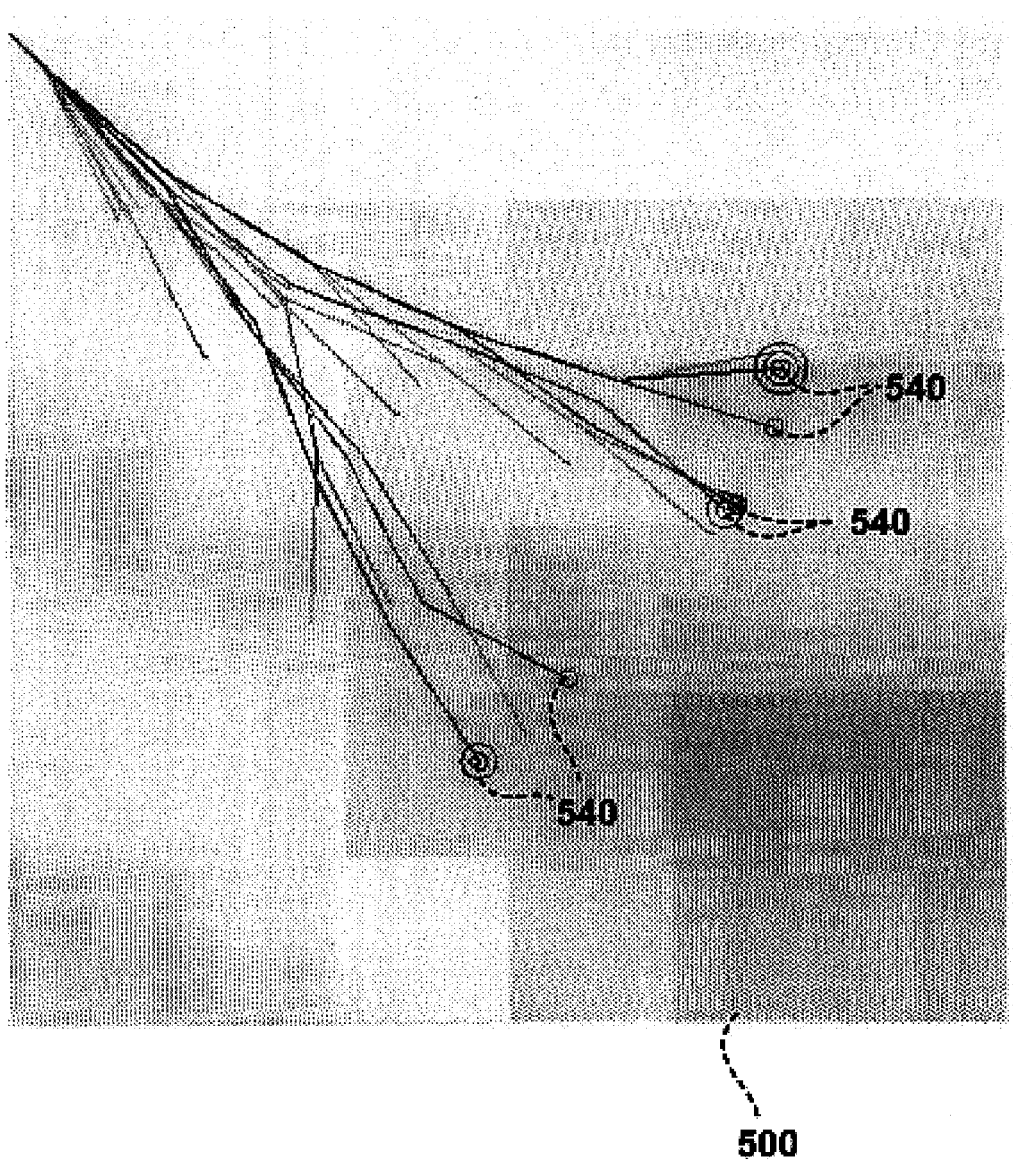

FIGS. 5A through 5D illustrate one particle filter iteration, illustrated for M=10 particle trajectories, grown in parallel over an image fragment 500. Selected current particles 510 shown in FIG. 5A for step i are extended to predicted locations 520 shown in FIG. 5B by one step, sampled at random, from the process density Φ. Next, new likelihood weights 530 shown in FIG. 5C are computed for nodes 520. Then, further paths, as reflected by nodes 540, are selected according to weight magnitudes 530, resulting in the death of some paths, i.e., as reflected by the nodes having weights 530 not also represented by nodes 540. Nodes 540 then become nodes 510 for purposes of the next iteration.

Figure 6A:
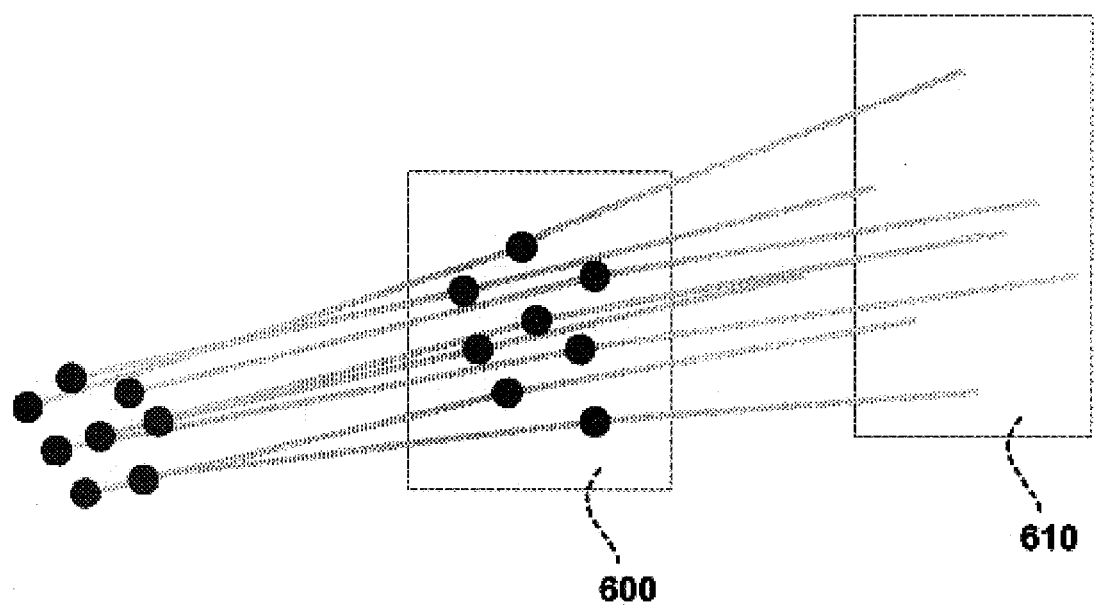
Figure 6B:
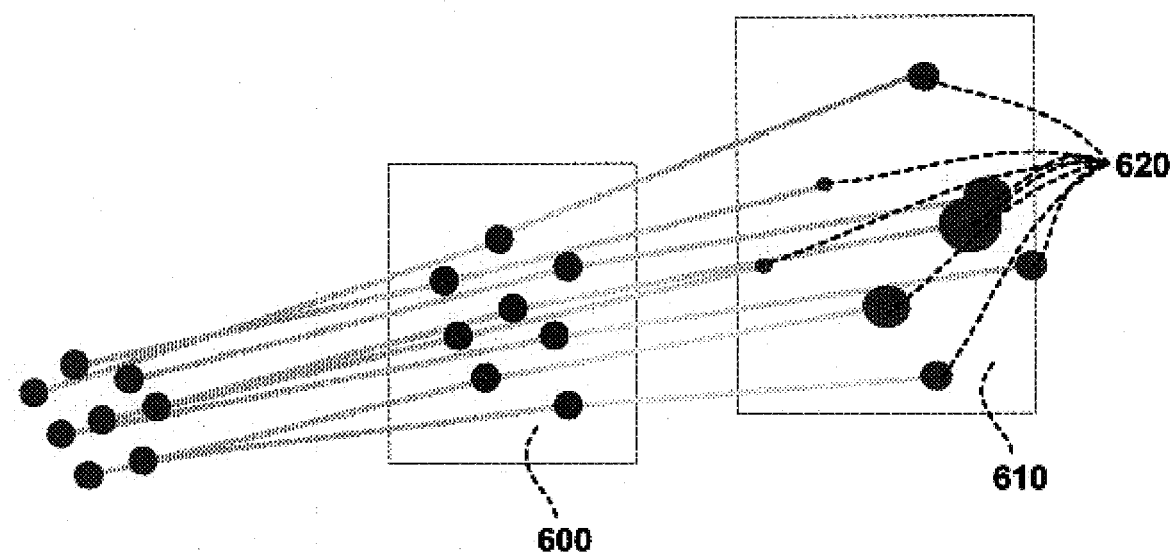
Figure 6C:
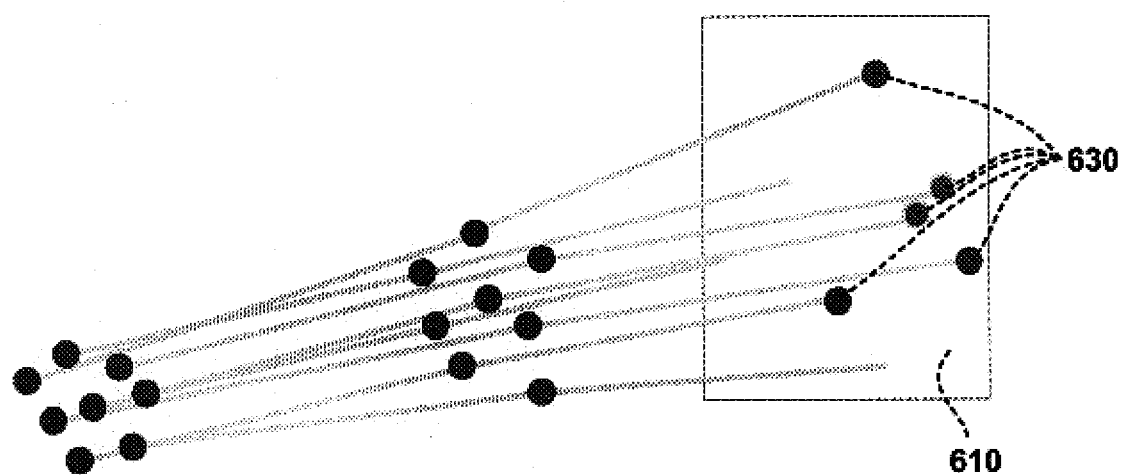
Figure 6D:
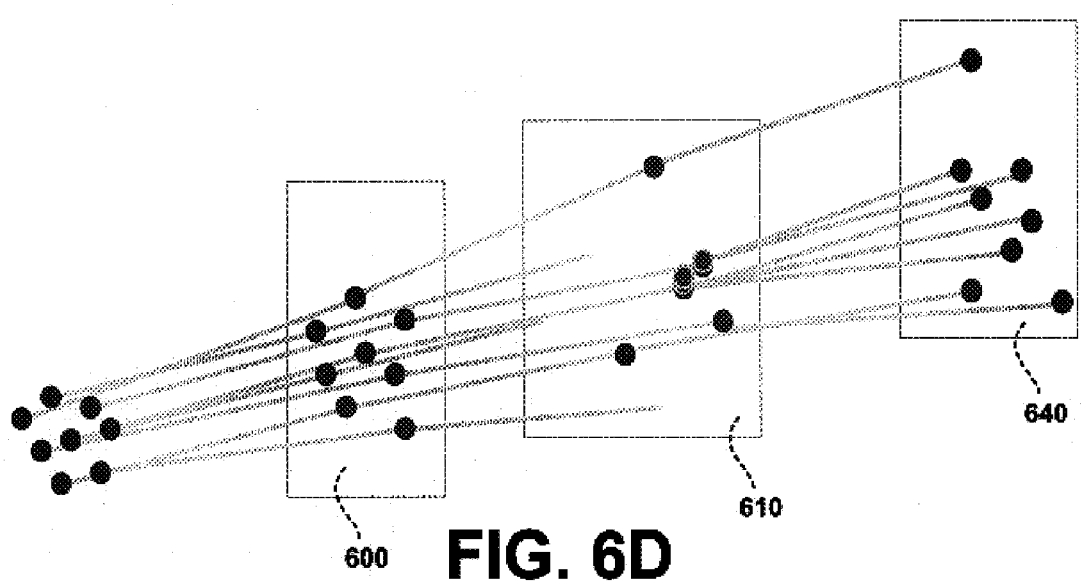

FIGS. 6A through 6D similarly show an iteration of the particle filtering techniques of the invention. FIG. 6A illustrates an initial starting point spray of nodes as represented within dashed box 600 in accordance with the present invention. The nodes in box 610 represent the algorithmic extension of the present invention from the nodes in box 600. FIG. 6B illustrates how the present invention weights the nodes extended within box 610, as represented by variably sized nodes 620. After a calculated weighing of which nodes 620 "make the cut" according to the invention, variably weighted, or sized, nodes 630 remain. From the remaining nodes 630 of box 610, new nodes 640 are sprayed along the new contour, and the process of the invention repeats itself.

In one embodiment of the invention, a user begins by making an input which starting point and direction provide initial conditions for the particle filter. The length of the initial input fixes the distance n over which $q_{0:n}^{(m)}$ is generated. The next step may be initiated by the user clicking to indicate a "restart region," and any particle $q_{0:i}^{(m)}$ (at any step $i \leq n$) lying inside the region is retained. The earliest. step i=j of any such particle is recorded, and particles from any subsequent step are discarded to leave a subset of the weighted particle set:

$$\{(q_{0:j}^{(m)}, \pi_j^{(m)}), m = 1 \dots M\}$$

for step j. Weights in the subset are renormalized to sum to 1, and the particle filter is restarted from step i=j, continuing for a number n of steps equal, as before, to the length of the user's next stroke.

Figure 7A:
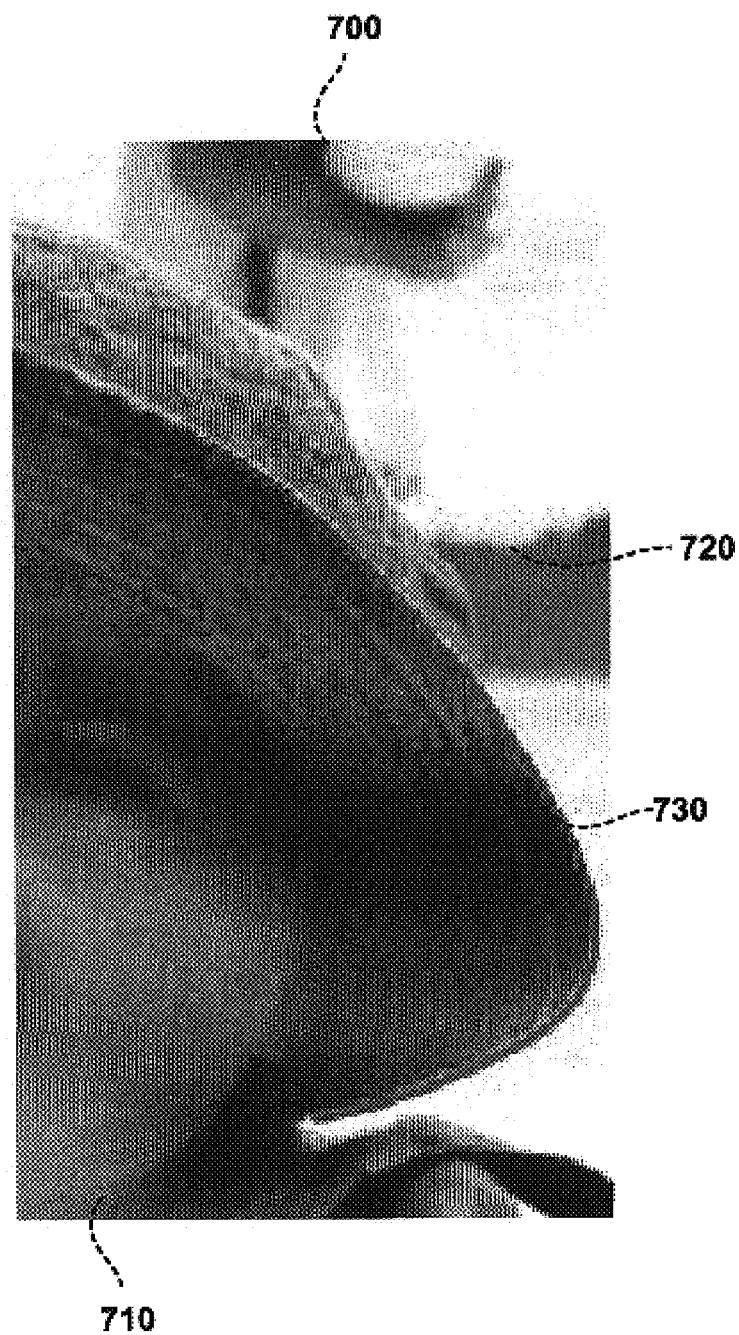
FIGS. 7A through 7C illustrate the successful use of user interaction via dams in accordance with one or more embodiments of the present invention.
Figure 7B:
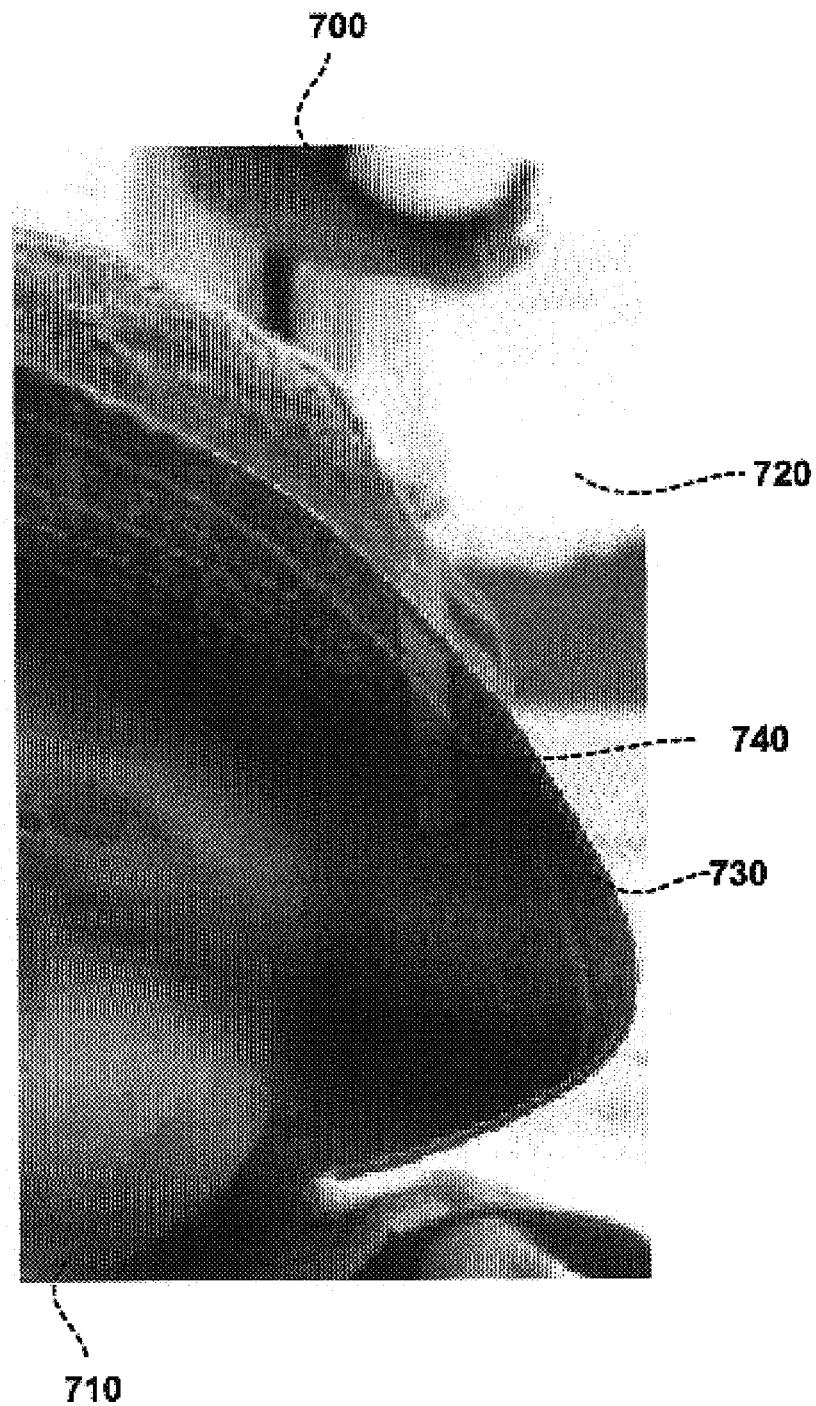
Figure 7C:
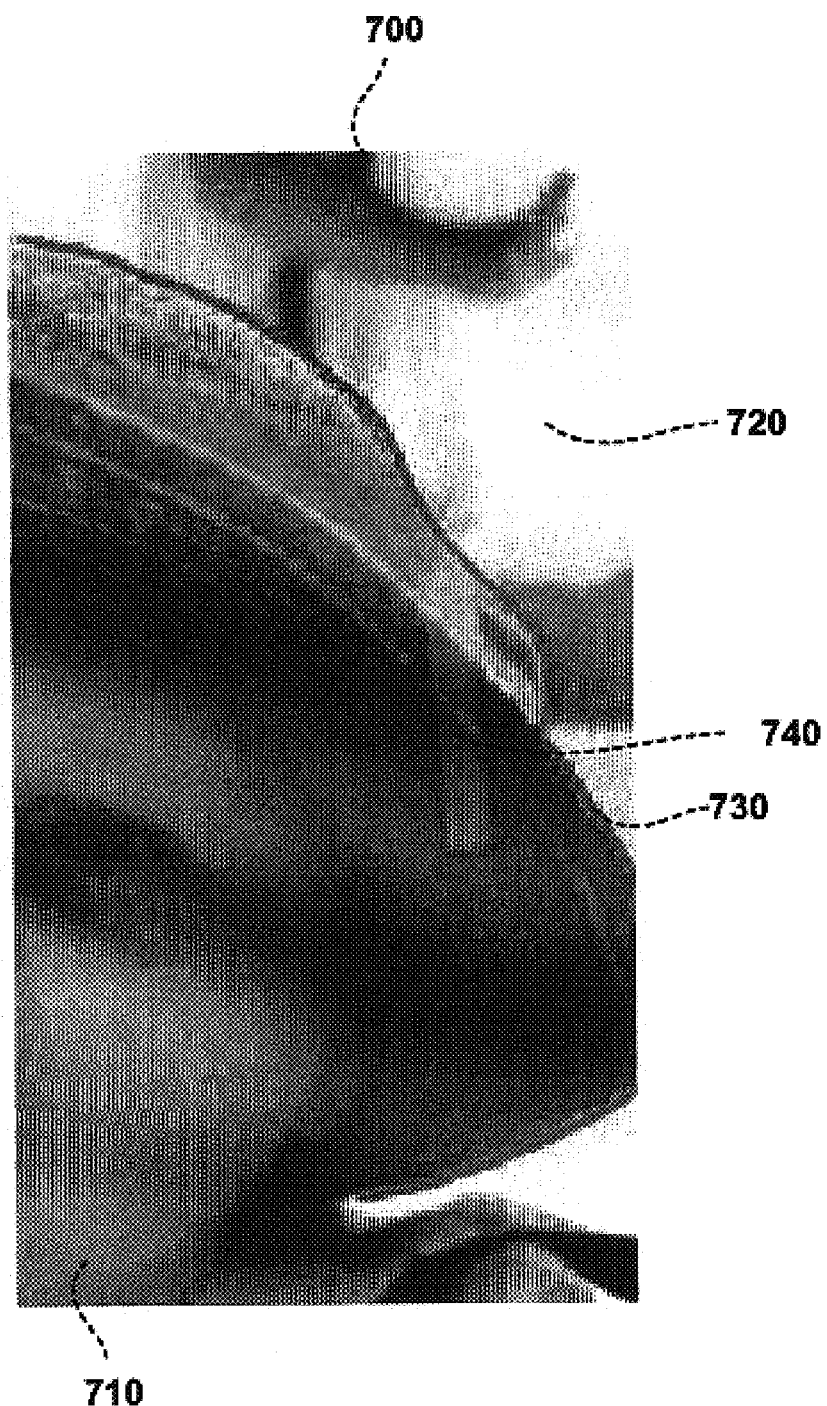

As mentioned above, dams can be placed on the image at the start of the cut-out procedure, prior to running the present invention. In practice, it proves most effective, and economical in terms of the number of user interventions required, to plant dams only on demand, while the present invention is operating. In this way, any errant particle flows may be combated as they occur. The operation of such dam(s) in accordance with various embodiments of the invention is illustrated in connection with FIGS. 7A through 7C. In FIG. 7A, image 700 has object of interest 710 with background 720. The start of the algorithm of the present invention includes the beginning of boundary curve 730. As boundary curve 730 propagates, a user may provide input dam 740 to steer off an incorrect boundary determination. As illustrated with FIG. 7C, dam 740 redirects curve 730 along the correct boundary path. Thus, user input is capable of specifying where the algorithm of the invention has made an arbitrarily generated background v. object of interest type mistake, and in such instance, the invention provides a better general solution.

In this regard, strongly textured objects and backgrounds pose a particular challenge for any automatic procedure for cut-out, because any feature detector designed to respond to boundary is liable to respond also to the texture.

The present invention, which may be utilized for cut-out purposes, uses an optimal curve formulation together with sequential Monte Carlo filtering to mark object boundaries interactively. The present invention is especially effective for problems in which the object is strongly textured and has a somewhat smooth boundary, thereby, inter alia, strengthening the available tools for interactive cut-out.

The sequential formulation of the optimization problem means that, in the prediction step of the particle filter, the process density Φ generates particles efficiently, concentrated around areas of likely curve continuation. This leads to efficient implementations, despite the use of random sample generation. The intrinsic order may be raised above the value $s=2$, in order to capture a wider range of curve properties in the intrinsic model. For example, $s=4$ may help to capture oscillations, and/or to help with segmenting corrugated boundaries. Furthermore, the coefficients of such an intrinsic cost function could possibly be learned, either offline for each member of some gallery of standard curve types, or adaptively, as boundary construction progresses. The present invention may also explicitly handle branches, for example at T-junctions, so that the boundary splits automatically, with both branches continuing to grow. Finally, in many practical cases, object boundaries appear not as abrupt intensity edges, but as intensity ramps, due for instance to defocus blur. Algorithms designed to handle these scenarios may also be incorporated into the present invention.

As mentioned above, while exemplary embodiments of the present invention have been described in connection with various computing devices and network architectures, the underlying concepts may be applied to any computing device or system in which it is desirable to cut-out images, or bound objects in image data. Thus, the techniques for discovering the boundaries of an object in accordance with the present invention may be applied to a variety of applications and devices. For instance, the boundary discovery techniques of the invention may be applied to the operating system of a computing device, provided as a separate object on the device, as part of another object, as a downloadable object from a server, as a "middle man" between a device or object and the network, etc. The boundary data generated may be stored for later use, or output to another independent, dependent or related process or service. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the boundary discovery techniques of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the image object boundary generation techniques as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Additionally, a line segment is formed by the expression of two points, and not necessarily an actually physically embodied line. Thus, while certain mathematical abstractions such as line segments, etc. are utilized herein, the invention is not limited to the explicit use of line segments, but rather it is the mathematical spirit expressed behind their use that is relevant. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for generating boundary data for bounding an object of interest in a source image, comprising:

selecting a starting point for the construction of the boundary data near the boundary of an object of interest;

applying an iterative optimization algorithm including particle filtering that probabilistically generates the boundary data, wherein said particle filtering includes applying a Monte Carlo technique that includes minimization of intrinsic costs and minimization of extrinsic costs; and interacting with the generated boundary data to correct where the algorithm has generated incorrect boundary data.

2. A method according to claim 1, wherein said particle filtering includes spraying a plurality of line segments substantially in parallel and probabilistically determining the likelihood that the endpoints of the plurality of line segments are along the boundary of the object of interest.

3. A method according to claim 2, wherein said probabilistic determining results in the termination of some line segments.

4. A method according to claim 1, wherein said applying includes applying an algorithm that minimizes a sum of costs, including costs associated with inconsistency of the image data and costs associated with undesired curve shape properties.

5. A method according to claim 4, wherein said applying of an algorithm that minimizes a sum of costs includes applying approximate optimization algorithms, keeping computational burden low, freeing resources to analyze intrinsic costs associated with local curvature.

6. A method according to claim 1, wherein said applying includes applying a particle filter optimization algorithm that incorporates a variable strength, intrinsic preference for boundary smoothness.

7. A method according to claim 6, wherein said applying of the particle filter optimization algorithm generates alternative sequences of random moves, constructed substantially in parallel, to avoid becoming stuck in local minima.

8. A method according to claim 1, wherein said Monte Carlo technique incorporates curve smoothness in addition to curve length as criteria.

9. A method according to claim 8, wherein the minimization of intrinsic costs has a first order and the minimization of extrinsic costs has a second order, and the maximum of the first and second order is greater than one.

10. A method according to claim 9, wherein coefficients of an intrinsic cost function associated with minimization of the intrinsic costs are at least one of (1) learned offline for each member of some gallery of standard curve types and (2) learned adaptively as boundary construction progresses.

11. A method according to claim 9, wherein the first order is a variable parameter whereby the first order may be raised in order to capture a wider range of curve properties in the intrinsic model.

12. A method according to claim 1, wherein said interacting includes choosing visually satisfactory locations on a stream from which to relaunch particles.

13. A method according to claim 1, wherein said interacting includes inputting a drop down dam to redirect a stream.

14. A method according to claim 13, wherein said interacting includes inputting a drop down dam to redirect the stream at a T-junction.

15. A method according to claim 13, wherein said placing of dams includes assigning a very low non-zero value to the likelihood of boundary data being at the dam such that in the event that all particles are accidentally encased in dams, the particles can in effect tunnel their way out.

16. A method according to claim 1, wherein said applying includes explicitly handling branches at a junction so that the boundary splits automatically with a plurality of branches continuing to grow from the junction.

17. A method according to claim 1, wherein said applying includes applying algorithms to handle object boundaries appearing as intensity ramps due to a blurring effect.

18. A method according to claim 1, wherein said applying includes breaking a smoothness constraint automatically at corners of the object boundary.

19. A method according to claim 1, wherein the boundary data is a polyline.

20. A method according to claim 1, further comprising:
extracting pixels bound by the boundary data; and
extracting an α-mask associated with the pixels bound by the boundary data.

21. A method according to claim 20, further comprising:
pasting the pixels bound by the boundary data onto a new background, using the associated α-mask.

22. A method according to claim 1, wherein said applying includes:
initializing the iterative algorithm to a first set of points based on said starting point;
iteratively performing prediction, likelihood weighting and selection for the first set of points and subsequently generated sets of points; and
maximizing by calculating an optimum Maximum a Posteriori Probability (MAP) curve.

23. A method according to claim 22, wherein the likelihood weighting includes calculating a product of local likelihood functions that apply at each curve point.

24. A method according to claim 23, wherein the local likelihood functions for each curve point include an edge likelihood, a corner likelihood and a user likelihood.

25. A method according to claim 24, wherein the edge likelihood is a probabilistic measure of the degree of consistency of the strength and direction of local image gradients with that of the boundary at the point, the corner likelihood is a special case of the edge likelihood, for use at image corners, which suppresses any sensitivity to direction and the user likelihood is a vehicle for guidance supplied interactively, by a user, wishing to bias or override the curve constructed automatically on the basis of the edge likelihood and corner likelihood alone.

26. A computer readable medium having stored thereon a plurality of computer-executable instructions for performing the method of claim 1.

27. A computing device comprising means for performing the method of claim 1.

28. A computer readable medium having stored thereon a plurality of computer-executable modules device for providing image data boundary analysis for forming boundary data for an object of interest in an image source, the computer executable modules comprising:
means for selecting a starting point for the construction of the boundary data near the boundary of an object of interest;
means for applying an iterative optimization algorithm including means for particle filtering that probabilistically generates the boundary data, wherein said means for particle filtering includes means for applying a Monte Carlo technique that includes minimization of intrinsic costs and minimization of extrinsic costs; and
means for interacting with the generated boundary data to correct where the algorithm has generated incorrect boundary data.

29. A computing readable medium according to claim 28, wherein said means for particle filtering includes means for spraying a plurality of line segments substantially in parallel and means for probabilistically determining the likelihood that the endpoints of the plurality of line segments are along the boundary of the object of interest.

30. A computing readable medium according to claim 29, wherein said means for probabilistic determining results in the termination of some line segments.

31. A computing readable medium according to claim 28, wherein said means for applying includes means for applying an algorithm that minimizes a sum of costs, including costs associated with inconsistency of the image data and costs associated with undesired curve shape properties.

32. A computing readable medium according to claim 31, wherein said means for applying an algorithm that minimizes a sum of costs includes means for applying approximate optimization algorithms, keeping computational burden low, freeing resources to analyze intrinsic costs associated with local curvature.

33. A computing readable medium according to claim 28, wherein said means for applying includes means for applying a particle filter optimization algorithm that incorporates a variable strength, intrinsic preference for boundary smoothness.

34. A computing readable medium according to claim 33, wherein said means for applying the particle filter optimization algorithm generates alternative sequences of random moves, constructed substantially in parallel, to avoid becoming stuck in local minima.

35. A computing readable medium according to claim 28, wherein said Monte Carlo technique incorporates curve smoothness in addition to curve length as criteria.

36. A computing readable medium according to claim 35, wherein the minimization of intrinsic costs has a first order and the minimization of extrinsic costs has a second order, and the maximum of the first and second order is greater than one.

37. A computing readable medium according to claim 36, wherein coefficients of an intrinsic cost function associated with minimization of the intrinsic costs are at least one of (1) learned offline for each member of some gallery of standard curve types and (2) learned adaptively as boundary construction progresses.

38. A computing readable medium according to claim 37, wherein the first order is a variable parameter whereby the first order may be raised in order to capture a wider range of curve properties in the intrinsic model.

39. A computing readable medium according to claim 28, wherein said means for interacting includes means for choosing visually satisfactory locations on a stream from which to relaunch particles.

40. A computing readable medium according to claim 28, wherein said means for interacting includes means for inputting a drop down dam to redirect a stream.

41. A computing readable medium according to claim 40, wherein said means for interacting includes means for inputting a drop down dam to redirect the stream at a T-junction.

42. A computing readable medium according to claim 28, the computer executable modules further comprising means for placing dams wherein said means for placing dams includes means for assigning a very low non-zero value to the likelihood of boundary data being at a dam such that in the event that all particles are accidentally encased in dams, the particles can in effect tunnel their way out.

43. A computing readable medium according to claim 28, wherein said means for applying includes explicitly handling branches at a junction so that the boundary splits automatically with a plurality of branches continuing to grow from the junction.

44. A computing readable medium according to claim 28, wherein said means for applying includes means for applying algorithms to handle object boundaries appearing as intensity ramps due to a blurring effect.

45. A computing readable medium according to claim 28, wherein said means for applying includes means for breaking a smoothness constraint automatically at corners of the object boundary.

46. A computing readable medium according to claim 28, wherein the boundary data is a polyline.

47. A computing readable medium according to claim 28, further comprising:
   means for extracting pixels bound by the boundary data; and
   means for extracting an α-mask associated with the pixels bound by the boundary data.

48. A computing readable medium according to claim 47, further comprising:
   means for pasting the pixels bound by the boundary data onto a new background, using the associated α-mask.

49. A computing readable medium according to claim 28, wherein said means for applying includes:
   means for initializing the iterative algorithm to a first set of points based on said starting point;
   means for iteratively performing prediction, likelihood weighting and selection for the first set of points and subsequently generated sets of points; and
   means for maximizing by calculating an optimum Maximum a Posteriori Probability (MAP) curve.

50. A computing readable medium according to claim 49, wherein the likelihood weighting includes calculating a product of local likelihood functions that apply at each curve point.

51. A computing readable medium according to claim 50, wherein the local likelihood functions for each curve point include an edge likelihood, a corner likelihood and a user likelihood.

52. A computing readable medium according to claim 51, wherein the edge likelihood is a probabilistic measure of the degree of consistency of the strength and direction of local image gradients with that of the boundary at the point, the corner likelihood is a special case of the edge likelihood, for use at image corners, which suppresses any sensitivity to direction and the user likelihood is a vehicle for guidance supplied interactively, by a user, wishing to bias or override the curve constructed automatically on the basis of the edge likelihood and corner likelihood alone.

53. A computing device comprising means for carrying out the plurality of computer-executable instructions of the computer readable medium of claim 28.

54. A computing device for providing image data boundary analysis for forming boundary data for an object of interest in an image source, comprising:
   means for selecting a starting point for the construction of the boundary data near the boundary of an object of interest;
   means for applying an iterative optimization algorithm including means for particle filtering that probabilistically generates the boundary data, wherein said means for particle filtering includes means for applying a Monte Carlo technique that minimizes intrinsic costs and extrinsic costs; and
   means for interacting with the generated boundary data to correct where the algorithm has generated incorrect boundary data.

55. A computing device according to claim 54, wherein said means for particle filtering includes means for spraying a plurality of line segments substantially in parallel and means for probabilistically determining the likelihood that the endpoints of the plurality of line segments are along the boundary of the object of interest.

56. A computing device according to claim 55, wherein said means for probabilistic determining results in the termination of some line segments.

57. A computing device according to claim 54, wherein said means for applying includes means for applying an algorithm that minimizes a sum of costs, including costs associated with inconsistency of the image data and costs associated with undesired curve shape properties.

58. A computing device according to claim 57, wherein said means for applying an algorithm that minimizes a sum of costs includes means for applying approximate optimization algorithms, keeping computational burden low, freeing resources to analyze intrinsic costs associated with local curvature.

59. A computing device according to claim 54, wherein said means for applying includes means for applying a particle filter optimization algorithm that incorporates a variable strength, intrinsic preference for boundary smoothness.

60. A computing device according to claim 59, wherein said means for applying the particle filter optimization algorithm generates alternative sequences of random moves, constructed substantially in parallel, to avoid becoming stuck in local minima.

61. A computing device according to claim 54, wherein said Monte Carlo technique incorporates curve smoothness in addition to curve length as criteria.

62. A computing device according to claim 61, wherein the minimization of intrinsic costs has a first order and the minimization of extrinsic costs has a second order, and the maximum of the first and second order is greater than one.

63. A computing device according to claim 62, wherein coefficients of an intrinsic cost function associated with minimization of the intrinsic costs are at least one of (1) learned offline for each member of some gallery of standard curve types and (2) learned adaptively as boundary construction progresses.

64. A computing device according to claim 63, wherein the first order is a variable parameter whereby the first order may be raised in order to capture a wider range of curve properties in the intrinsic model.

65. A computing device according to claim 54, wherein said means for interacting includes means for choosing visually satisfactory locations on a stream from which to relaunch particles.

66. A computing device according to claim 54, wherein said means for interacting includes means for inputting a drop down dam to redirect a stream.

67. A computing device according to claim 66, wherein said means for interacting includes means for inputting a drop down dam to redirect the stream at a T-junction.

68. A computing device according to claim 54, further comprising a means for placing dams, wherein said means for placing of dams includes means for assigning a very low non-zero value to the likelihood of boundary data being at a dam such that in the event that all particles are accidentally encased in dams, the particles can in effect tunnel their way out.

69. A computing device according to claim 54, wherein said means for applying includes explicitly handling branches at a junction so that the boundary splits automatically with a plurality of branches continuing to grow from the junction.

70. A computing device according to claim 54, wherein said means for applying includes means for applying algorithms to handle object boundaries appearing as intensity ramps due to a blurring effect.

71. A computing device according to claim 54, wherein said means for applying includes means for breaking a smoothness constraint automatically at corners of the object boundary.

72. A computing device according to claim 54, wherein the boundary data is a polyline.

73. A computing device according to claim 54, further comprising:
   means for extracting pixels bound by the boundary data; and
   means for extracting an α-mask associated with the pixels bound by the boundary data.

74. A computing device according to claim 73, further comprising:
   means for pasting the pixels bound by the boundary data onto a new background, using the associated α-mask.

75. A computing device according to claim 54, wherein said means for applying includes:
   means for initializing the iterative algorithm to a first set of points based on said starting point;
   means for iteratively performing prediction, likelihood weighting and selection for the first set of points and subsequently generated sets of points; and
   means for maximizing by calculating an optimum Maximum a Posteriori Probability (MAP) curve.

76. A computing device according to claim 75, wherein the likelihood weighting includes calculating a product of local likelihood functions that apply at each curve point.

77. A computing device according to claim 76, wherein the local likelihood functions for each curve point include an edge likelihood, a corner likelihood and a user likelihood.

78. A computing device according to claim 77, wherein the edge likelihood is a probabilistic measure of the degree of consistency of the strength and direction of local image gradients with that of the boundary at the point, the corner likelihood is a special case of the edge likelihood, for use at image corners, which suppresses any sensitivity to direction and the user likelihood is a vehicle for guidance supplied interactively, by a user, wishing to bias or override the curve constructed automatically on the basis of the edge likelihood and corner likelihood alone.

* * * * *